United States Patent

Bjorn et al.

[15] 3,688,590
[45] Sept. 5, 1972

[54] REVERSIBLE MOTOR INTERLOCK ASSEMBLY FOR VEHICLE WHEEL SPINNERS AND THE LIKE

[72] Inventors: Thomas E. Bjorn, Northbrook; Ralph W. Morrisett, Evanston, both of Ill.

[73] Assignee: Stewart-Warner Corporation, Chicago, Ill.

[22] Filed: April 29, 1971

[21] Appl. No.: 138,590

[52] U.S. Cl. ..................................................74/16
[51] Int. Cl. .............................................F16m 11/00
[58] Field of Search .............74/16; 73/457, 466, 467

[56] References Cited

UNITED STATES PATENTS

| 3,078,720 | 2/1963 | Hofmann, Jr. | 73/466 X |
| 3,483,764 | 12/1969 | Hunter | 74/16 |

*Primary Examiner*—William F. O'Dea
*Assistant Examiner*—F. D. Shoemaker
*Attorney*—Augustus G. Douvas, Willaim J. Newman and Norton Lesser

[57] ABSTRACT

A control assembly for a reversible motor operating a drive wheel in a wheel spinner used for vehicle wheel balancing or the like including a power switch for actuating the motor when the drive wheel is moved into engagement position with the vehicle wheel and a reversing switch for selectively reversing the direction of rotation of the drive wheel. The control assembly includes locking structure for the two switches so that a polarity to the motor cannot be changed with the power switch in a closed condition and the power switch cannot be closed with the reversing switch in an intermediate condition. A brake is also provided for the drive wheel when returned to its non-engaging position to stop the motor before the motor polarity can be reversed.

12 Claims, 8 Drawing Figures

INVENTORS
Thomas E. Bjorn
Ralph W. Morrisett

By *A. G. Douvas*
Attorney

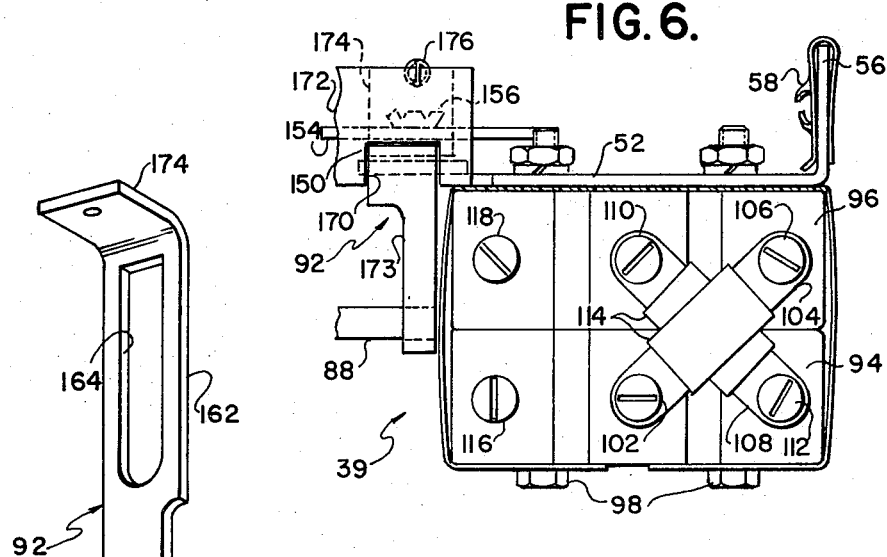
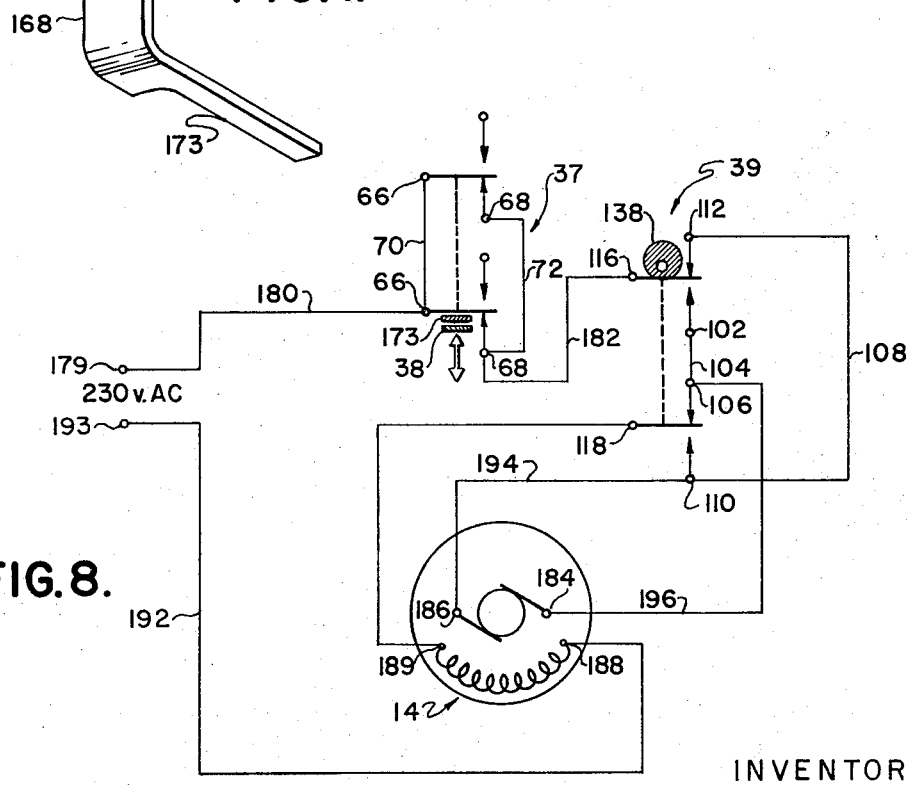

REVERSIBLE MOTOR INTERLOCK ASSEMBLY FOR VEHICLE WHEEL SPINNERS AND THE LIKE

BRIEF DESCRIPTION OF THE INVENTION

1. Field of the Invention

This invention relates to motor control arrangements for vehicle wheel spinner units or the like. More particularly it relates to control arrangements for reversible motors as they may be used on vehicle wheel spinners employed in vehicle wheel unbalance analyzing procedures.

2. Description of the Prior Art

Vehicle wheel spinner units have been used for many years in procedures for determining wheel unbalance while the wheel is mounted on the vehicle. Such units have been used whether mechanical on-the-wheel balancer techniques or electronic analyzing techniques were employed. However, in performance of these procedures the vehicle wheel was rotated by the spinner units in one direction only, so that reversible motors were not required. This was satisfactory for the mechanical balancer techniques in which the device attached to the wheel was manipulated to counteract the unbalance in the wheel. It has been determined that the single direction spin procedure is not always adequate when using the electronic analyzing techniques. This is especially true if there is a substantial amount of looseness in the suspension system of the vehicle being tested. This looseness was especially disturbing to the phasing of the electronically generated signals which is used to establish the location of the unbalanced wheel utilizing a well known stroboscopic technique. This problem can, however, be corrected by spinning the wheel first in one direction to determine an apparent angular locus of unbalance, then in the opposite direction to determine a second apparent angular locus. The angular location of unbalance may then be taken as the radius which bisects the angle between the two apparent loci, and the wheel may be balanced by the proper placement of a compensating weight at the point indicated by the bisection.

The use of a reversible motor in the vehicle wheel spinner unit for employing these new procedures has presented problems to the users of the equipment such as employed in gasoline service stations and auto repair shops. In many instances, the operators would reverse the polarity of electric power to the motor while the spinner drive wheel was still in contact with the spinning vehicle wheel. The motor rotating in one direction, while being electrically connected to rotate in the opposite direction, of course, causes the condition which seriously damages the equipment.

SUMMARY OF THE INVENTION

The present invention is directed to apparatus for controlling the motor so that it cannot be reversed while it is still in its loaded or vehicle wheel engaging position. Furthermore, provisions are made such that when the polarity reversing means is being operated, the power circuit to the motor is broken regardless of whether the spinner is in its vehicle wheel engaging or non-engaging position. As a particular aspect of this invention apparatus is provided for controlling the motor which comprises a support bracket, on-off switch means and polarity reversing switch means mounted on said bracket for providing electric power of a desired polarity to said motor, a shaft mounted on said bracket for rotation between two extreme positions, means for operating said reversing switch means to one polarity when the shaft is in one extreme position and to the opposite polarity when the shaft is in the other extreme position, a locking member carried by the shaft, means including a locking element mounted on the bracket and operable to engage the locking member to prevent rotation of the shaft when the shaft is in one of the extreme positions and the motor is in a load condition, and means on the locking element operative in cooperating with the on-off switch means to provide electric power to the motor when the shaft is in one of the extreme positions and the motor is in a load condition.

The objects, advantages and features of this invention will be better understood from a further study of a preferred embodiment as described in the following specification and shown in the accompanying drawings.

BRIEF DESCRIPTION OF THE DRAWINGS

FIG. 6 is a section view taken along line 6—6 of FIG. 4 and showing the interconnection of the polarity reversing switches;

FIG. 7 is a perspective view of the locking slide; and

FIG. 8 is a schematic circuit diagram of the spinner motor incorporating the electrical components of the motor interlock of this invention.

Figure 1:
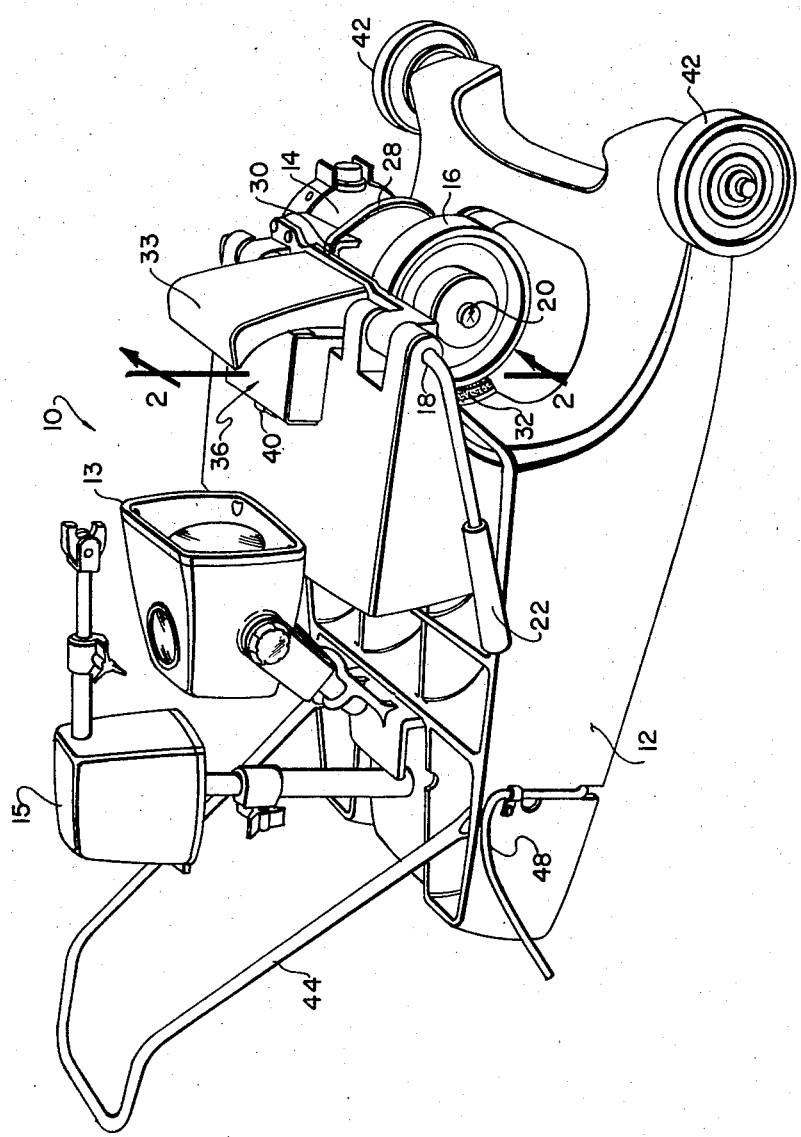
FIG. 1 is a perspective view of an electronic wheel balancer incorporating a wheel spinner associated with the reversible spinner motor interlock of this invention.
Figure 2:
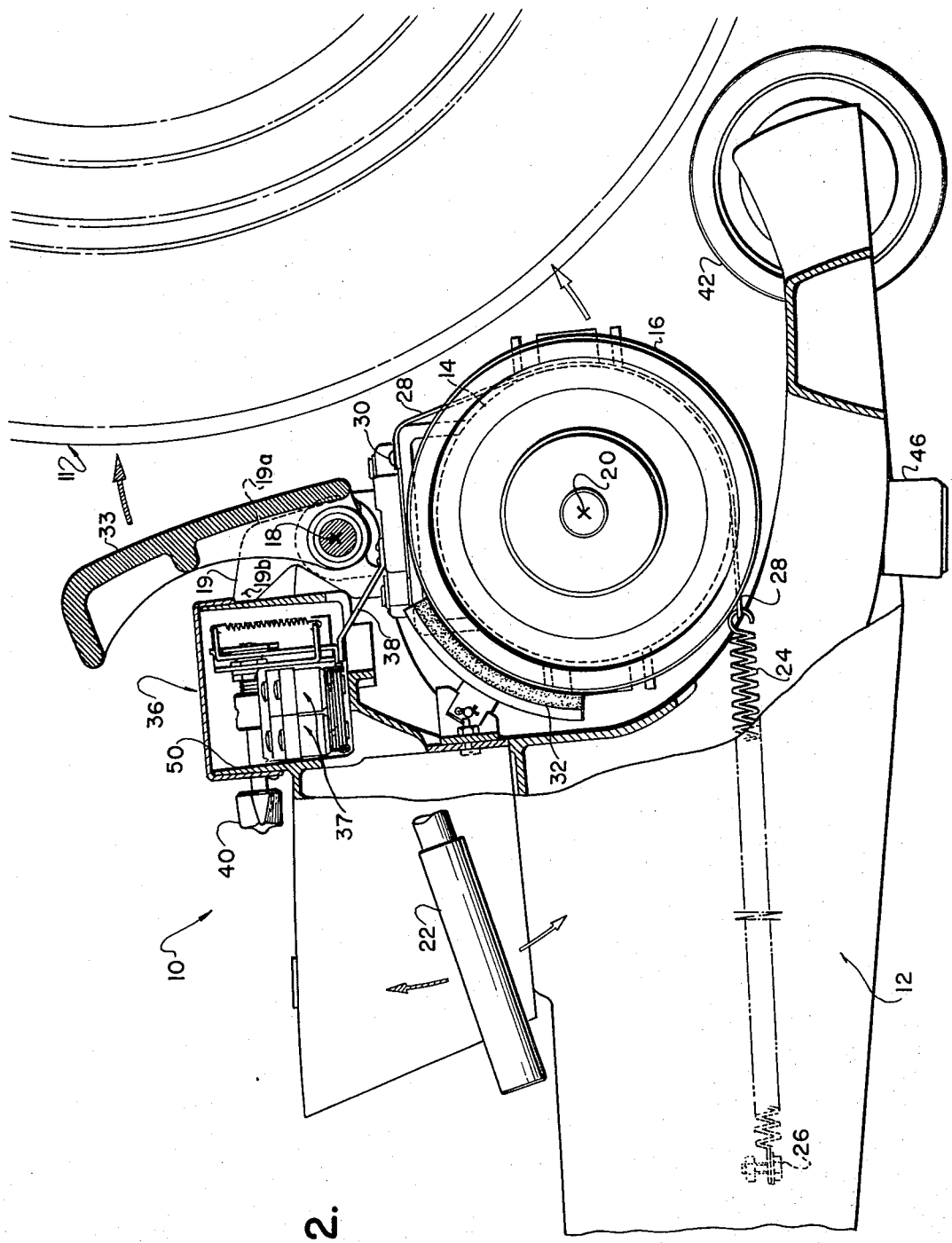
FIG. 2 is a section view taken along line 2—2 of FIG. 1 and showing some of the details of the spinner motor interlock assembly.

Reference is first made to FIGS. 1 and 2 which show a vehicle wheel spinner device 10 used for selectively rotating a vehicle wheel 11 which is mounted on a vehicle with its frame jacked up to enable the wheel to be spun during wheel unbalance analyzing procedures, or the like. The wheel spinner unit 10 comprises a base 12 having mounted thereon a drive motor 14 with its drive wheel 16 positionable to engage the tread of the vehicle wheel 11 to cause rotation thereof. As may be seen in this particular embodiment, but not necessarily so for the practice of this invention, the motor 14 is suspended from a horizontally disposed pivot shaft 18 so as to be movable about the axis of shaft 18 thereof responsive to operator manipulation of either one of the handles 22. Thus, when the operator pushes one of the handles 22 downwardly, the motor 14 and hence its drive wheel 16, are rotated in a counterclockwise direction as shown in FIG. 1 to engage the vehicle wheel 11. The motor and drive wheel are biased in a clockwise direction by means of a spring 24 having one end fixed to the base 12 by a bolt 26 and its other end connected to a strap 28 fixed to the casing of the motor 14 by means of a blot 30. The motor is thus biased to a home position which is defined by a brake shoe 32 adjacent the periphery of the drive wheel 16 and fixed to the spinner base 12 by appropriate means (not shown).

The spinner unit also has a vehicle wheel braking member 33 which is manipulatable by the levers 22 to engage the periphery of vehicle wheel 11 by rotation of the levers 22 in the upward direction. Brake drive element 19 has a forward surface 19a which drives brake 33 into contact with wheel 11. Element 19 also includes a stop finder 19b which limits the counterclockwise movement of motor 14 and its drive wheel 16 into engagement with wheel 11. It is to be noted that the motor 14 and the braking unit 33 are suitably clutched to the shaft 18 to enable their positioning into contact with the vehicle wheel. Since the clutch means do not form any part of the present invention, they are not shown or described in any detail.

Additionally, electronic strobe lamp 13 and magnetic pick-up 15, while shown because these elements are part of an electronic wheel balancer, the invention herein is not concerned with these elements.

The motor 14 is controlled by means of a control assembly 36 which is suitably mounted on the base 12 in cooperative relationship with the positioning of the motor 14 so as to be operative only when the motor is rotated into its counterclockwise position by the downward movement of the levers 22. To this end a lever arm 38 which is attached to rotate about the pivot shaft axis 18 with the motor 14, cooperates with the motor control assembly 36 in a manner to be described in detail along with the detailed description of the motor control assembly 36 hereinafter. Briefly, however, the motor control assembly 36 includes power switch means and reversing switch means 37, 39 (see FIGS. 3–6, 8) which are manipulatable by an operator controllable reversing knob 40 and lever arm 38 to actuate the motor as it is brought into contact with the vehicle wheel 11 to turn the wheel in a direction as determined by the position of the reversing knob 40. The control assembly 36 is constructed to prevent the operation of the reversing and power switches in a manner which would cause damage to the equipment, as will be seen hereinafter.

The spinner unit 10 also has positioning wheels 42 and a handle 44 so that the unit may be easily rolled into position adjacent the vehicle wheel. Stationary supports 46 are provided on the bottom of the spinner base 12 and constructed to raise the positioning wheels 42 off the ground when the unit is supported thereon to provide a relatively stationary support for the spinner unit when in its operative position as shown in FIG. 2 Also, a suitable electric power cord 48 is provided for proper electrical connection of the unit to a power source.

The motor control assembly 36 comprises a housing 50 which is part of the base 12 of the wheel spinner unit 10. The lever arm 38 is movable with the motor 14 by suitable fastening means (not shown). Lever arm 38 actuates elements within the motor control assembly as hereafter set forth. A bracket 52 is in turn secured to the housing 50 by appropriate screws 54 (see FIGS. 3, 4) and serves as the primary supporting structure for the components making up the motor control assembly.

Reference is now made to FIGS. 3 through 7 which show the construction of the motor control assembly 36 in greater detail. It may be seen that the support bracket 52 is essentially a flat plate having flanges 56 at its outer ends to which four speed nuts 58 are attached for receiving screws 54 to secure the bracket 52 to the housing 50. The power switch means 37 previously mentioned comprises a pair of single micro-switches 60, 62 bolted to the bracket 52 by means of bolts 64. The common terminals 66 and the normally closed terminals 68 of the switches 60, 62 are electrically connected together by strap means 70, 72 respectively, to act in parallel for control of the power connection for the motor. The normally open contacts 74 of the power switches are not used. The switch contacts are operated by means of a switch arm 76 which is pivotably mounted at 78 on a bracket 80 which is secured to the casings of the switches 60, 62 by screws 82. Adjustable lock screw arrangements 84 are provided on the switch arm 76 for engaging the switch buttons 86 which, when depressed, will open the normally closed connection between common terminals 66 and the normally closed terminals 68. The switch arm 76 includes a somewhat flexible member 88 which is secured thereto by rivets 90 and engages at its unsupported end a locking element or slide 92 for cooperation therewith in a manner to be hereinafter described.

The reversing switch means 39 previously mentioned is made up of a pair of single switch 94, 96 which are fastened to the support bracket by bolts 98 in the same manner as the power switches 60, 62. A conducting strap 104 interconnects the normally open contact terminal 102 of switch 94 to the normally closed contact terminal 106 of switch 96, and a second strap 108 interconnects the normally open contact terminal 110 of switch 96 with the normally closed contact terminal 112 of switch 94 with appropriate insulation sleeves 114 thereon to prevent a shorting between the strips. The common terminal 116, 118 of these switches are not interconnected to each other but are connected along with other switch terminals between the power source and the motor in a manner to be discussed hereinafter with respect to the schematic diagram shown in FIG. 8. The switch contacts for the reversing switches 94, 96 are actuated by means of a switch arm 120 which is pivotably mounted at 122 to a bracket 124 secured to the casing of switches 94, 96 by appropriate screw means 126. Appropriate lock screw means 128 are provided on the switch arm 120 which engage the contact operating button 130 to actuate the switch contacts. The arm 120 also carries a flexible member 132 by means of rivets 134. Flexible member 132 engages the eccentric periphery 136 of a cam member 138 which is fixed to a rotatable shaft 140 and secured thereto by set screw 142. A shaft 140 is journaled for rotation within a bearing 144 which extends through an aperture in the support bracket 52 with a collar 150 on the bearing engaging the bracket 52 at one side thereof. The bearing 144 has external threads 152 which receive a lock washer 148 and a nut 146 so as to cooperate with the collar 150 to secure the bearing to the bracket 52. The end of the shaft 140 extends through to the exterior of the motor control housing 50 and carries the motor reversing knob 40 for operator manipulation. The eccentric cam is set on the shaft 140 such that when the reversing knob 40 is in the position shown in FIG. 3, the reversing switch arm 120 is in its raised position to extend contact buttons 130, and when it is rotated to its position 180° opposite the switch arm 120 is in its lower position to depress the switch contact buttons 130.

At the other end of the shaft 140 a locking plate 154 is fastened thereto by appropriate means such as staking at 156. The locking plate has a small radius portion 155 and a large radius portion 157 and cooperates with the locking element or slide 92 to prevent operation of the control switches under certain conditions. As may best be seen in FIG. 7, the locking slide comprises a body portion 162 having a slot 164 within which resides the portion of the shaft 140 between the locking plate 154 and the journal 150 with appropriate washers 166 on either side thereof (see FIG. 5). The lower portion 168 of the slide body 162 extends through an aperture 170 located in a flange 172 formed by a turned up portion of the support bracket 52. The aperture 170 along with the shaft 140 serve as a guide for the locking slide to move up and down over a distance defined by the length of slot 164 in the body of the locking element 162. A rearwardly extending arm 173 is provided at the bottom of the locking slide body 162 and engages the flexible element portion 88 of the power switch arm 76. It is also adapted to engage the lever 38 which moves with the drive motor 14 as it is brought into and out of engagement with the vehicle wheel as shown in FIG. 1.

A forward extending arm 174 is located at the top of the locking slide 92 and is adapted to fit into one or the other of the recesses 158, 160 when the locking plate 154 is properly positioned. A spring 176 extends between the locking slide upper arm 174 and the support bracket flange 172 to normally bias the locking slide to its lower position as defined by an abutment 178, 179 at the bottom of the respective locking plate recesses 158, 160.

As previously indicated, the motor position lever 38 engages the bottom arm 173 of the locking slide 92 so as to provide a control to the position of the locking slide dependent on the position of the motor. Thus, when the drive motor 14 is in its at-home position in its non-loaded condition with the drive wheel 16 out of contact with the vehicle wheel, the motor position lever 38 is in its upper position to force the locking slide 92 to its upper position where its upper arm is withdrawn far enough to permit rotation of the locking plate 154 in a direction to permit the smaller radius portion 155 of the locking plate underneath the upper arm as represented by the dotted position denoted 174a. When in this motor-at-home position condition, the power switch arm 76 depresses the contact button 86 to open the normally closed power contact, thus maintaining the motor power cut off. Since the power is cut off in this condition, it is safe to reverse the contacts of the reversing switch means 39 and since the locking slide arm 174 is out of the recess 158 sufficiently to permit clockwise rotation of the locking plate 154, the operator may rotate the reversing switch knob 40. As he does so the eccentric cam 136 permits the reversing switch arm 120 to lower, thus depressing contact buttons 130 to change the polarity connection for the drive motor.

As soon as the operator moves the drive motor out of the at-home position by moving the handle 22 (FIG. 1) downwardly, the motor position lever 38 drops to permit the spring 176 to pull the locking slide 92 downwardly to position the upper arm 174 in the appropriate recess 158, 160. Likewise, the lower arm 173 of the locking slide releases the switch arm 76 of the power switches so as to withdraw the contact button 86 and close the normally closed power switch contact. Thus, the drive motor 14 is operating to cause the drive wheel 16 to rotate the vehicle wheel and the operator is prevented from reversing the polarity connection to the motor because the locking plate 154, and hence the shaft 140, knob 40 are prevented from rotation by the locking slide upper arm 174 residing in the appropriate locking plate recess 158, 160. The reversing knob 40, and hence the reversing switches, cannot be changed until the drive motor is brought back to its at-home position, at which time the drive wheel brake 32 is in engagement with the drive wheel 16 and the motor position lever 38 raises the locking slide 92 to its upper position with the upper arm 174 removed from the appropriate locking plate recess.

It will be noted that the reversing control has full 180 degrees movement while the motor is in its at-home position with the short radius portion 155 of the locking plate 154 passing under the locking slide upper arm 174. However, if the operator mistakenly leaves the reversing control in an intermediate position such that the short radius portion 155 is directly under the locking slide arm 174, the locking slide cannot be pulled down to its lower position even if the drive motor 14 is moved out of its at-home position and into engagement with the vehicle wheel. Since the locking slide remains in its upper position, the lower arm of the locking slide maintains the power switch arm in its upper position, thus maintaining the power contacts open. Therefore, power cannot be delivered to the motor unless the reversing knob is in one or the other of its extreme positions as represented by the diametrically opposed locking plate recesses which must cooperate with the locking slide 92 to permit the power switch contacts to be closed.

The schematic circuit diagram of the energizing circuit for the spinner motor 14 incorporating the reversible motor interlock of this invention is shown in FIG. 8.

In general, the circuitry of FIG. 8 energizes motor 14 whenever handle 22 (see FIGS. 1 and 2) is depressed so that drive wheel 16 is in contact with the vehicle wheel 11 to be spun. Motor 14 is deenergized whenever handle 22 is released so that element 173 of lever slide 92 moves vertically so as to open the normally closed contacts of power switch 37. In the event that reversing switch knob 40 (see FIGS. 1-3) is reversed from the position shown in the drawings to its opposite position, reversing switch 39 reverses current flow through the motor 14, armature winding connected to terminals 186, 184. In all instances the motor 14 field winding connected to terminals 188, 189 is subjected to current flow in the same direction.

Figure 3:
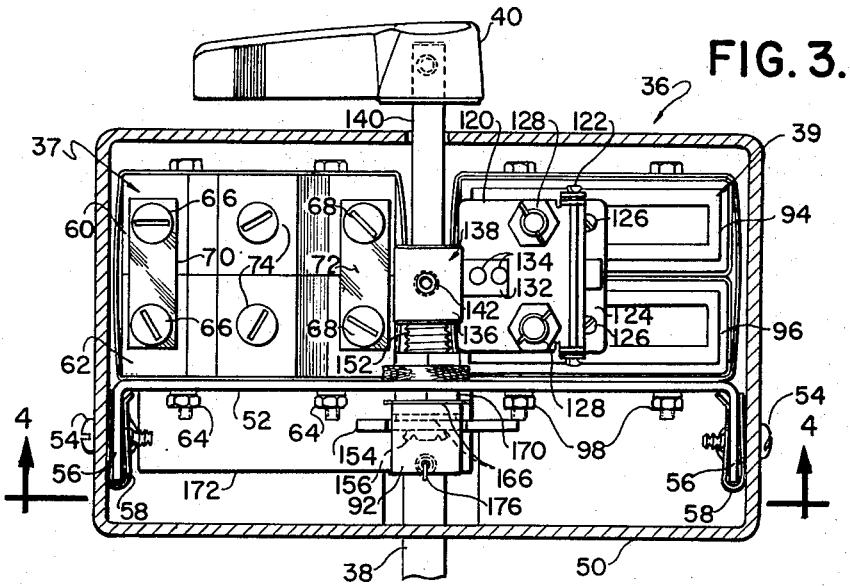
FIG. 3 is a plan view of the spinner motor interlock assembly with the cover removed and part of housing in section or broken away.

Assuming that handle 22 is depressed and reversing switch knob 40 is in the position shown in FIGS. 1 through 3, the detailed circuit operation is as follows:

An alternating-current line voltage is applied to terminals 179, 193. In view of the fact that handle 22 is depressed, extending arm 173 of slide 92 enables power switch 37 to assume the contact position shown in FIG. 8. Line voltage from terminal 179 is therefore applied to conductor 180, multiply connected terminals 66, through conductor 70, multiply connected terminal 68 through conductor 72, and thereafter to terminal 116 of reversing switch 39 through conductor 182.

Figure 4:
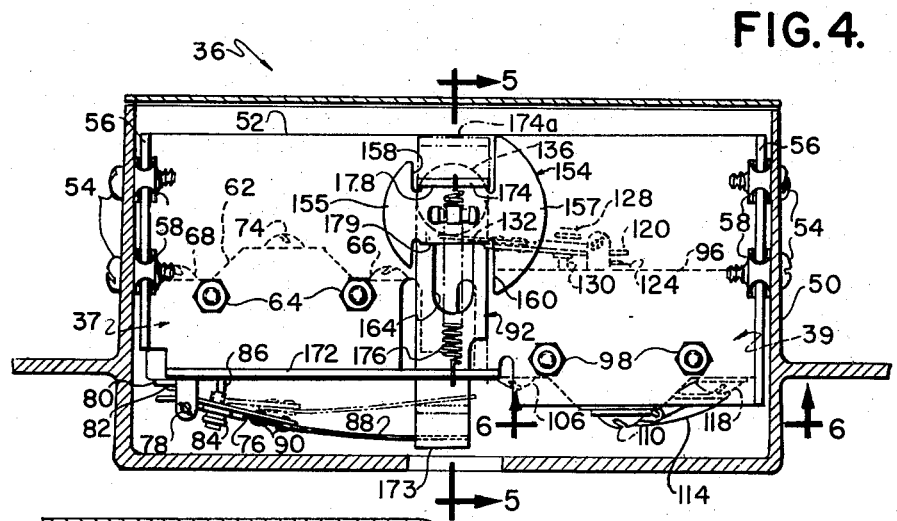
FIG. 4 is a section view taken along line 4—4 of FIG. 3 and showing the interlock plate in one of its two motor energizing positions.
Figure 5:
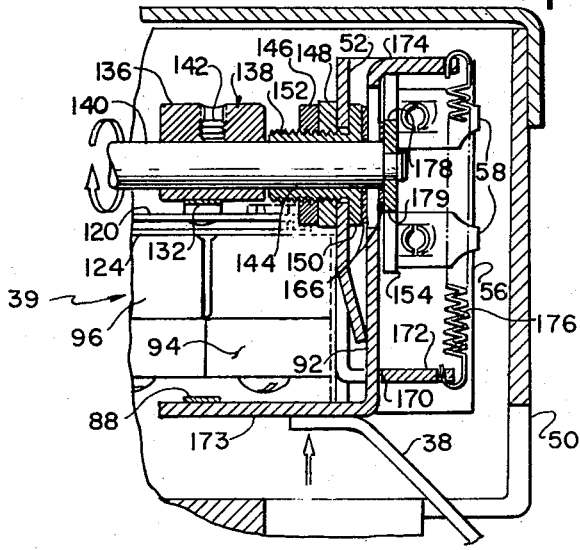
FIG. 5 is a section view taken along line 5—5 of FIG. 4 modified, however, by showing the locking slide elevated to deenergize the motor.

In view of the fact that eccentric cam 138 is in the position shown in FIGS. 4, 5 and 8, the upper contacts of the switch are closed and line voltage is applied to terminal 112, conductor 108, terminal 110, conductor 194, terminal 186 through the motor 14 armature winding, terminal 184, conductor 196, terminal 106, terminal 118, terminal 189 through the motor 14 field winding, terminal 188, conductor 192 back to terminal 193. Thus, the spinner motor 14 is energized and drive wheel 16 is driven in a first direction.

In the event it is desired to reverse the direction of wheel spin, the manual downward holding force of handle 22 is relieved permitting motor 14 and drive wheel 16 to pivot in a clockwise direction around shaft 18, thus elevating element 173 in response to the upward movement of the left end of lever arm 38 (see FIGS. 1 and 5). With this occurrence the reversing knob 40 can be rotated 180° from the position shown in FIGS. 1 through 3 inasmuch as extending arm 174 of slide 92 is no longer engaged by locking plate 154.

This manual operation of knob 40 rotates eccentric 138 180° so that power reversal switch 39 is driven to engage the lower contacts shown in FIG. 8. With this contact position and when handle 22 is again depressed so that drive wheel 16 engages the vehicle wheel, current flow is reversed in the motor 14 armature as compared to that flowing in the motor 14 field winding. Accordingly, shaft output is in the reverse direction. In particular, voltage appearing at terminal 116 flows through terminal 102, conductor 104, terminal 106, conductor 196, terminal 184 through the motor 14 armature winding, terminal 186, conductor 194, terminal 110, terminal 118, terminal 189 through the motor 14 field winding, terminal 188, and conductor 192 back to line terminal 193.

It should be noted that the 180° rotation of cam member 138 merely produced a reversal of current flow through the motor armature as compared to the field. This, of course, produces a reversal in shaft rotation.

It should also be noted that cam 138 cannot be rotated unless drive wheel 16 is lowered so that lever arm 38 elevates locking slide 92. The elevation of locking slide 92 is required to remove extending arm 174 from its abutment locking position against either of surfaces 178, 179 of locking plate 154. With this elevation of locking slide 92, knob 40 may be rotated to permit polarity reversal through the motor armature winding to produce a reverse spin whenever the handle 22 is again manually depressed so that the contacts for power switch are closed.

While there has been described a preferred embodiment of a system utilizing the teachings of this invention, it is to be understood that many modifications and additions may be made thereto without materially deviating from its teachings. Therefore, it is intended to be bound only by the scope of the appended claims.

What is claimed is:

1. A vehicle wheel spinner unit for use analyzing vehicle wheel unbalance or the like, comprising
    a base,
    a reversible electric motor mounted on said base,
    a drive wheel operable by said motor,
    means including an operator manipulatable device for selectively moving said drive wheel between vehicle wheel engaging and non-engaging positions,
    and an assembly for controlling the energization and direction of rotation of said motor to control the direction of spin of said vehicle wheel, said assembly comprising
    on-off switch means and direction reversing switch means in
    an electric circuit connection with said motor,
    means operable by said drive wheel moving means for actuating said on-off switch means to energize said motor only when said drive wheel is in its vehicle wheel engagement position,
    operator manipulatable means for actuating said reversing switch means between opposite direction positions,
    and means operable by said drive wheel moving means for locking said reversing switch actuating means to prevent operation of said reversing switch means unless said drive wheel is in its non-engaging position.

2. In the unit of claim 1 wherein said locking means includes means for preventing the actuation of said on-off switch means whenever said reversing switch actuating means is in between said opposite direction positions.

3. In the unit of claim 1 wherein said reversing switch actuating means comprises
    a shaft mounted on said assembly for rotation between two extreme positions,
    and a cam on said shaft,
    wherein said reversing switch means comprises
    reversing switch contacts,
    and means including a cam follower in operable engagement with said cam for operating said reversing switch contacts to one direction in one extreme position of said shaft and to the opposite direction in the other extreme position,
    and wherein said locking means comprises
    a locking plate mounted for rotation with said shaft and having a pair of recesses spaced along the periphery thereof,
    a locking element mounted adjacent the periphery of said locking plate, said locking element positioned for movement into a recess only when said shaft is in one of said extreme positions to lock said shaft from rotation, said locking element having an arm in cooperative relationship with said drive wheel moving means for preventing said locking element from moving into a recess when said drive wheel is in its vehicle wheel non-engaging position.

4. In the unit of claim 3 wherein said on-off switch means comprises,
    electric power contacts,
    and a switch arm in operational relationship with said locking element arm and said drive wheel moving means for maintaining said electric power contacts open whenever said locking element is not in one of said recesses.

5. In the apparatus of claim 4 wherein said drive wheel moving means comprises
a lever operable by said operator manipulatable device,
and wherein said on-off switch arm is in engagement with said locking element arm which in turn is engageable with said lever, whereby said on-off switch arm always follows the movement of said locking element and said locking element follows the movement of said lever only when said reversing switch actuating means shaft is in one of its extreme positions.

6. In the unit of claim 1 comprising in addition a brake shoe in positional relationship with said drive wheel to brake same when in its non-engaging position.

7. In the unit of claim 2 comprising in addition a brake shoe in positional relationship with said drive wheel to brake same when in its non-engaging position.

8. In the unit of claim 5 comprising in addition a brake shoe in positional relationship with said drive wheel to brake same when in its non-engaging position.

9. For use in a wheel spinner unit for rotating a vehicle wheel or the like having a base, a reversible electric motor mounted on said base, a drive wheel operable by said motor, and an operator manipulatable device for selectively moving said drive wheel between vehicle wheel engaging and non-engaging positions, an assembly for controlling the energization and direction of rotation of said motor to control the direction of spin of said vehicle wheel comprising
support means mounted on said base,
on-off switch means and direction reversing switch means mounted on said support means and in electric circuit connection with said motor,
means operable by said operator manipulatable device for actuating said on-off switch means to energize said motor only when said drive wheel is in its vehicle wheel engagement position,
operator manipulatable means for actuating said reversing switch means between opposite direction positions,
and means operable by said operator manipulator device for locking said reversing switch actuating means to prevent operation of said reversing switch means unless said drive wheel is in its non-engaging position.

10. In the assembly of claim 9 wherein said locking means includes means for preventing the actuation of said on-off switch means whenever said reversing switch means is in between said opposite direction positions.

11. In the assembly of claim 9 wherein said reversing switch actuating means comprises
a shaft mounted on said support means for rotation between two extreme positions,
and a cam on said shaft,
wherein said reversing switch means comprises
reversing switch contacts,
and means including a cam follower in operable engagement with said cam for operating said reversing switch contacts to one direction in one extreme position of said shaft and to the opposite direction in the other extreme position,
and wherein said locking means comprises
a locking plate mounted for rotation with said shaft and having a pair of recesses spaced along the periphery thereof,
a locking element mounted on said support means adjacent the periphery of said locking plate, said locking element positioned for movement into a recess only when said shaft is in one of said extreme positions to lock said shaft from rotation, said locking element having an arm in cooperative relationship with said operator manipulatable device for preventing said locking element from moving into either of said recesses when said drive wheel is in its vehicle wheel non-engaging position.

12. In the unit of claim 11 wherein said on-off switch means comprises,
electric power contacts,
and a switch arm and said operational relationship with said locking element arm and said operator manipulatable device for maintaining said electric power contacts open whenever said locking element is not in one of said recesses.

* * * * *